(12) United States Patent
Jones

(10) Patent No.: US 10,447,625 B2
(45) Date of Patent: Oct. 15, 2019

(54) SYSTEM FOR REDUCING CONFLICT BETWEEN PARTIES THAT MUST COMMUNICATE WITH EACH OTHER

(71) Applicant: Launi J Jones, Scottsdale, AZ (US)

(72) Inventor: Launi J Jones, Scottsdale, AZ (US)

(*) Notice: Subject to any disclaimer, the term of this patent is extended or adjusted under 35 U.S.C. 154(b) by 0 days.

(21) Appl. No.: 14/136,127

(22) Filed: Dec. 20, 2013

(65) Prior Publication Data
US 2014/0181227 A1 Jun. 26, 2014

Related U.S. Application Data
(60) Provisional application No. 61/745,059, filed on Dec. 21, 2012.

(51) Int. Cl.
*H04L 12/58* (2006.01)
*G06Q 10/10* (2012.01)

(52) U.S. Cl.
CPC ........... *H04L 51/063* (2013.01); *G06Q 10/10* (2013.01)

(58) Field of Classification Search
CPC ..... G06Q 10/10–10/107; H04L 12/58–12/586; H04L 51/00–51/38
See application file for complete search history.

(56) References Cited

U.S. PATENT DOCUMENTS

| | | | |
|---|---|---|---|
| 6,823,363 B1* | 11/2004 | Noveck | H04L 12/1813 709/204 |
| 8,205,264 B1* | 6/2012 | Kailash | H04L 67/02 709/223 |
| 8,473,281 B2* | 6/2013 | Maude et al. | 704/9 |
| 8,590,002 B1* | 11/2013 | Chebiyyam et al. | 726/1 |
| 2003/0078972 A1* | 4/2003 | Tapissier et al. | 709/204 |
| 2004/0181581 A1* | 9/2004 | Kosco | 709/206 |
| 2005/0160144 A1* | 7/2005 | Bhatia | 709/206 |
| 2007/0233547 A1* | 10/2007 | Younger | G06F 17/248 705/7.14 |
| 2010/0241844 A1* | 9/2010 | Hussain et al. | 713/150 |
| 2012/0011357 A1* | 1/2012 | Finlay | 713/152 |
| 2012/0198357 A1* | 8/2012 | Tozzi | G06Q 50/182 715/753 |
| 2013/0036478 A1* | 2/2013 | Davis | G06Q 10/107 726/28 |
| 2013/0060863 A1* | 3/2013 | D'Eri et al. | 709/206 |
| 2013/0070672 A1* | 3/2013 | McFarland | H04L 65/1069 370/328 |

\* cited by examiner

*Primary Examiner* — Clayton R Williams
(74) *Attorney, Agent, or Firm* — Venjuris, P.C.

(57) ABSTRACT

A system and method for reducing conflict between parties that must communicate with each other are disclosed. In its most basic form, the invention is embodied in a system comprising the steps of: pairing users with system-specific unique address (e.g. e-mail address or text message destination number); receiving each electronic message and edit it as necessary in order to eliminate inflammatory or inappropriate language; and sending the edited electronic message to the intended recipient user, optionally with a copy of the edited electronic message also sent to the sending user.

18 Claims, 2 Drawing Sheets

SYSTEM FOR REDUCING CONFLICT BETWEEN PARTIES THAT MUST COMMUNICATE WITH EACH OTHER

CROSS-REFERENCE TO RELATED APPLICATIONS

The present application claims priority to U.S. provisional patent application entitled "System for Reducing Conflict Between Parties That Must Communicate With Each Other," having Ser. No. 61/745,059, filed on Dec. 21, 2012, which is entirely incorporated herein by reference.

FIELD OF THE INVENTION

The present invention relates to a system and method for reducing conflict between parties that must communicate with each other.

DESCRIPTION OF RELEVANT ART

All communication has the potential to include hostile or otherwise inappropriate elements. Most of the time, hostile or otherwise inappropriate communication is self-correcting. For example, one of the parties to the hostile communication simply stops the unwanted communication (i.e., "hangs up").

There are circumstances, however, where communication must continue even if it has been historically hostile. Divorcing or divorced parents are one example of such a circumstance. Almost all divorcing or divorced parents must continue to communicate on a regular basis. Unfortunately, constructive communication between divorced or divorcing parents is too often overwhelmed by intense emotions, making it practically impossible for the parties to effectively and properly communicate with each another.

Hostile communication environments typically become even more volatile with e-mail. The presently known system of e-mail does not lend itself well to moderating an e-mail prior to it reaching its destination. As shown in FIG. 1, current e-mail systems primarily comprise four elements: (1) a sender's message transfer agent (or "MTA"), (2) a receiver's MTA, (3) a storage database, and (4) a mail user agent (or "MUA"). As those in the art know, the term "MTA" or "message transfer agent" refers to software that handles either sending or receiving an e-mail message from another MTA. "MUA" refers to software for e-mail users to access stored messages (e.g., POP3, IMAP, HTTP). The MTA works in the background, while the e-mail user usually interacts directly with the MUA. Depending on the MUA, e-mail messages may be downloaded to a local computer or simply displayed on a local computer but stored on a database remote to the user.

In operation, presently known e-mail typically follows these basic steps: (1) a receiver's MTA 20 receives mail from a sender's MTA 10, wherein the transmission details are specified by the simple mail transfer protocol (SMTP); (2) the receiver's MTA 20 takes the inbound message and saves to a stored database 30 (typically, a mail server); and (3) the receiver's MUA logs into the database and retrieves the message for display on the receiver's computer 40.

In practice, it is quick and easy to create a nasty, hurtful e-mail and press the send button. And as anyone who has used e-mail or other types of messaging knows, e-mail cannot currently be retrieved or intercepted once sent. As such, currently known e-mail systems cannot allow e-mail interception/editing prior to the e-mail reaching its destination after the e-mail has been sent. Thus, current hostile environment e-mail communication includes not only the necessary information but also the unnecessary, hostile, or otherwise inappropriate information.

In this light, what is needed is a communication system that can strip out the inflammatory parts of an e-mail prior to viewing by the receiver. That way, only the factual information gets conveyed (i.e., "can you pick up Johnny from practice on Friday night"), thereby eliminating sparks that would otherwise ignite future conflict.

SUMMARY OF THE INVENTION

The structure, overall operation and technical characteristics of the present invention will become apparent with the detailed description of a preferred embodiment and the illustration of the related drawings as follows. For ease of discussion, the term "e-mail" and "electronic message" will be used in this specification, but those terms should be understood broadly to include the various forms of electronic messaging, such as e-mail, text-messaging, tweeting, and other types of electronic communication.

The present invention is incorporated in a system and method for reducing conflict between parties that must communicate with each other. In its most basic form, the invention is embodied in a system comprising the following steps:

1. A system host provides paired users (e.g., divorced parents) with system-specific unique e-mail addresses;
2. The paired users send e-mail to each other using only the system-specific addresses;
3. The system host will receive each e-mail and edit it as necessary in order to eliminate inflammatory or inappropriate language;
4. After the system host has completed its review and stripped the e-mail of the offending content, the system host sends the e-mail to the intended recipient user, with a copy of the edited message also sent to the sending user.

One object of this invention is to reduce conflict between parties that must communicate with each other by an on-line, supervised interception/intervention process (which may include e-mail, text or IM messages, or web communications) providing positive, helpful structure and screening to its users in order to help them reduce conflict by teaching them to effectively communicate in situations which otherwise can lead to negative, counter-productive or confrontational communications.

Another object of this invention is to help users communicate in situations that may give rise to conflict and confrontation without the counter-productive emotions and provocative language often expressed in communications, while ensuring the writer is able to effectively communicate necessary information.

Another object of this invention is to provide individuals with a "teaching" experience through feedback demonstrating how to effectively and properly communicate.

Another object of this invention is to teach the user, by example, how to communicate appropriately, without needing to use this invention in the future.

BRIEF DESCRIPTION OF THE DRAWINGS OR PICTURES

DESCRIPTION OF THE PREFERRED EMBODIMENTS

For ease of discussion, the term "pair" will be used in this specification to mean two real people communicating using the conflict reduction system 100, but the invention disclosed herein applies equally to more than two similarly situated people. Likewise the term "auditor" means an employee of the system host tasked with editing inbound messages prior to their delivery to the final receiver, but it should also be construed to include automated software capable of performing the same function.

Figure 1:
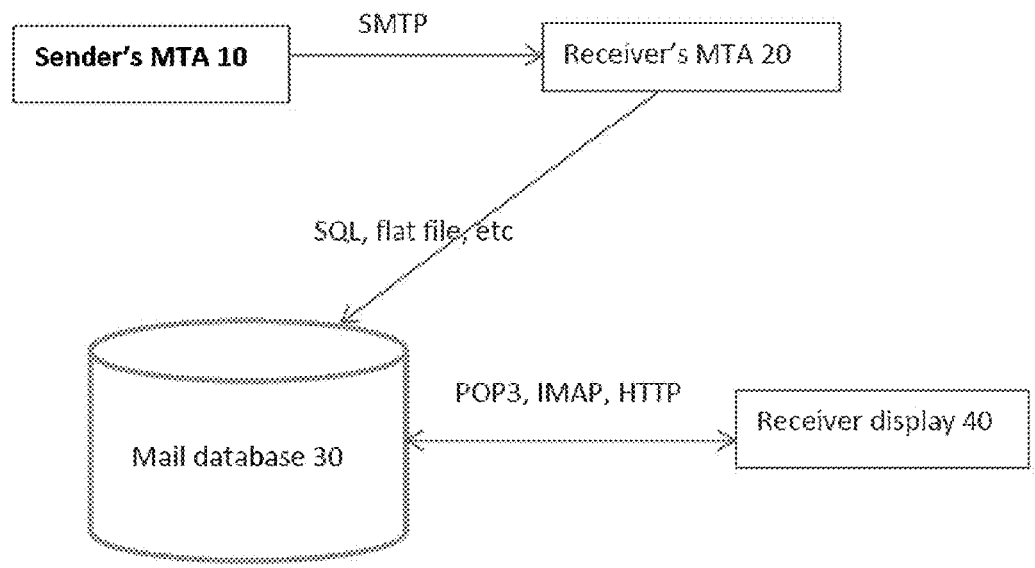
FIG. 1 is flow chart illustrating the typical prior art flow for e-mail.
Figure 2:
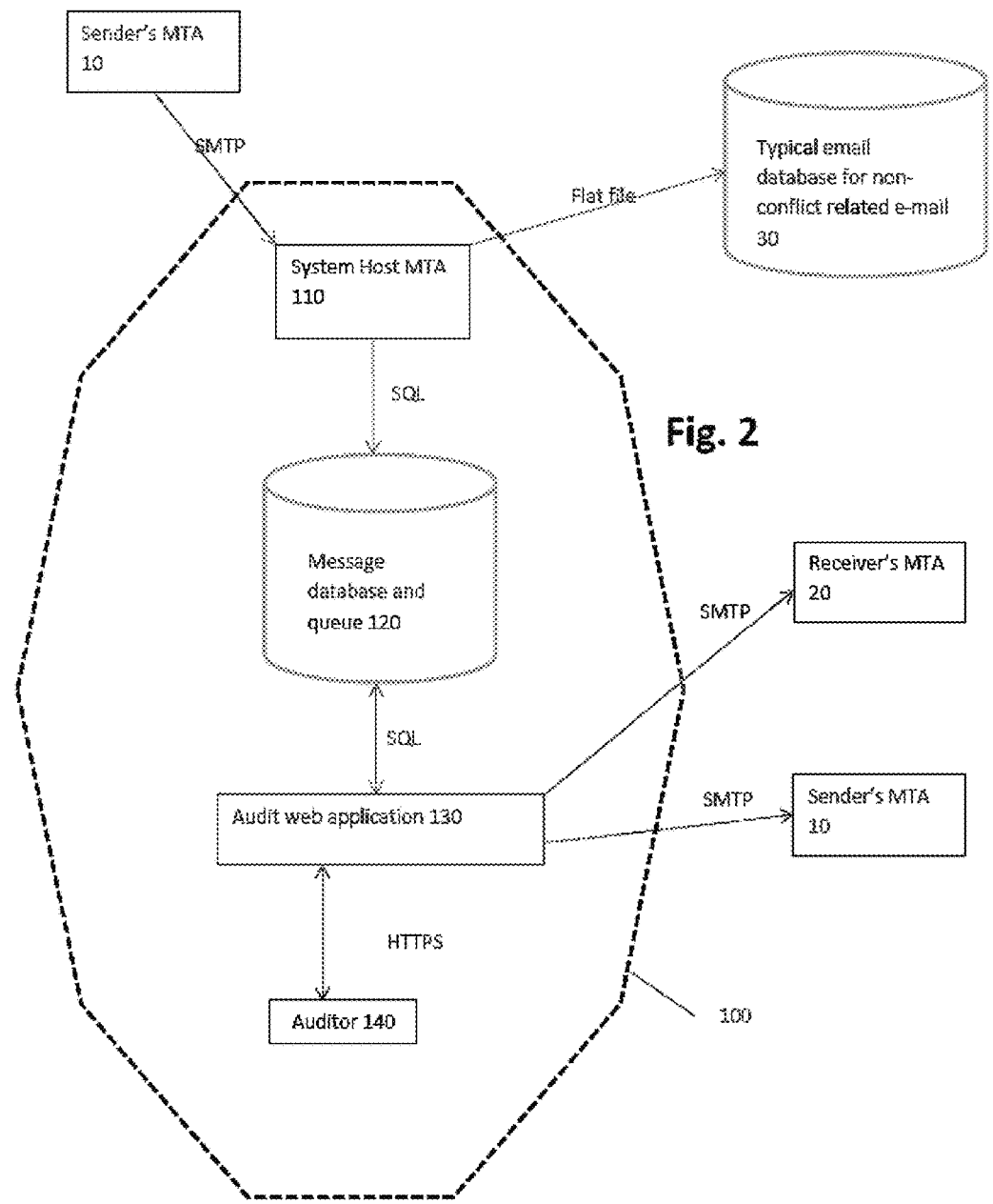
FIG. 2 is flow chart illustrating the preferred embodiment of the system.

Turning now to FIG. 2, the preferred conflict reduction system 100 (sometimes, system 100) generally comprises a system host MTA 110, a conflict reduction database 120, an auditor interface 130 and at least one auditor 140. Prior to using the system 100, the system host provides new users with system-specific unique e-mail addresses. In addition, the system host links paired users to each other in the conflict reduction database 120.

In operation, a first user sends an e-mail to a second user using the system-specific e-mail address. The system host MTA 110 stores the e-mail in the conflict reduction database 120 for access and optional modification by an auditor 140 via the auditor interface 130 prior to sending the e-mail to the receiver's MTA 20. The auditor interface 130 may be displayed on any type of electronic displays, such as a computer screen or a touch screen of a mobile device. The system (either via the system host MTA 110 or the auditor interface 130) may notify the auditor that a new e-email is waiting for auditing in the database.

One way to implement this system is to employ four basic modules: a signup module, an e-mail intake module, an audit module and e-mail delivery module. In the preferred signup module, the system host links a first user and a second user to create a pair and stores that information in the conflict reduction database 120. In the preferred e-mail intake module, the system host MTA 110 receives user e-mail and stores in in the system host database 120. In the preferred audit module, an auditor 140 can log into and access the system host database 120 via a web application 130 to review and edit user e-mail, and the web application 130 may automatically adjust its layout for properly displaying the e-mail to be edited on any type of electronic displays. Either the preferred e-mail intake module or the preferred audit module may notify the auditor 140 of the incoming e-mail that has been stored in the system host database 120, waiting to be audited. And finally, in the preferred e-mail delivery module, the system host can send audited user e-mail to a receiver's MTA 20. In this way, a first user can send an e-mail to a second user's e-mail address and have it reviewed and modified by an auditor before the e-mail is received by the second user.

Example Embodiment: Signup Via Web Application

For the purpose of discussion, a user pair comprises a first user and a second user. The first user signs up via a web application, supplying her e-mail address and a unique identifier to create the pair, such as a case number. In this example, the first user has an e-mail address of jane@yahoo.com. The system host would then create a system-specific e-mail address, preferably with some random characters, such as jane-07abd@systemhost.com.

The first user (Jane) is provided with the virtual e-mail address at signup so she can give it to the paired second user (e.g., Mark). When the second user signs up to the web application, the unique identifier is used to determine if the person is the other member of the pair (i.e., Mark). If so, the new signup is immediately provided with the first user's (i.e., Jane's) system-specific e-mail address.

The system host also notifies Jane of the other party (Mark) signing up, providing her with his newly-created system specific e-mail address. In this example, the second user (Mark) would have an address of mark-6651a@systemhost.com.

At no point do Jane and Mark need to see each other's true e-mail addresses in the system.

Example Embodiment: Delivery and Audit

Again turning to FIG. 2, the sender's MTA 10 connects to system host MTA 110. The system host MTA 110 uses the sender's originating e-mail address and the receiver's virtual e-mail address to determine which pair is communicating. If the receiver is a system host employee, custom processing halts here and the message is delivered normally. Otherwise, the inbound message is stored in a system host queue 120 for transaction processing.

Next, a logged-in auditor 140 is notified and may edit the message via a web application 130.

After edits are complete, system host's web application 130 delivers the message to the receiver's MTA 20. Optionally, the host web application 130 can also deliver a copy of the edited e-mail back to the sender's MTA 10, preferably with some tips selected by the auditor 140.

Alternate Delivery Methods

Instead of e-mail, the system 100 can be adapted to allow message receipt via a text SMS message. In that case, the message is delivered to a single system host number, such as 602-444-5000. The sender's phone number is used to identify the pair and thus the final recipient phone number for when the audit process is done.

Likewise, other messaging protocols such as GTalk and ICQ can be implemented by creating virtual contacts within the system on the existing virtual e-mail addresses. Each party then adds the virtual contact to his/her IM friends list to communicate through the system.

While the invention has been described by means of specific embodiments, numerous modifications and variations could be made thereto by those ordinarily skilled in the art without departing from the scope and spirit of the invention set forth in the claims.

What is claimed is:

1. A computer implemented method for reducing conflict between parties that must communicate with each other, comprising executing on a processor the steps of:

receiving an electronic communication having an originating address and a receiving address;

checking a conflict reduction database to verify whether the originating address is stored in the conflict reduction database;

the conflict reduction database comprising a plurality of paired users, each user in the conflict reduction database comprising two addresses, a first address supplied by the user and a second address that is used for communication between the paired users;

wherein each pair comprises a husband and wife engaged in a divorce proceeding, wherein if the originating address is not stored in the conflict reduction database, allowing the electronic communication to continue to its destination, wherein if the originating address is paired in the conflict reduction database with the receiving address, storing the communication in a message database for conflict reduction audit;

adding the communication to a queue of conflict reduction communications;

providing an auditor interface on an electronic display for viewing and editing of conflict reduction communications; and, sending an edited version of the communication to the second address of a non-sending member of the pair, the edited version not including the sender's first address in the communication so that the user's first address remains hidden from the non-sending member of the pair.

2. The computer implemented method of claim 1, wherein the sending step sends the audited electronic communication to a sending member of the pair.

3. The computer implemented method of claim 2, wherein the edited version of the communication comprises an auditor's comment.

4. The computer implemented method of claim 1, wherein the method further comprises an automated editing step after the receiving step.

5. The computer implemented method of claim 1, wherein the auditor interface is a web application.

6. The computer implemented method of claim 1, further comprising the step of notifying an auditor that a communication has been received for editing by the auditor.

7. A system for reducing conflict between parties that must communicate with each other comprising:

a computer database comprising a plurality of paired users, each user having an original address and a system specific address, each pair comprises adverse parties in a domestic violence proceeding;

a computer server coupled to the computer database and programmed to:
receive electronic communication from a sender;
identify whether the sender is a paired user;
if the sender is not a paired user, allow the electronic communication to continue to its destination;
if the sender is a paired user, save the electronic communication for auditing by a third party;
add the saved electronic communication to a queue of conflict reduction communications,
provide an auditor interface on an electronic display for viewing and editing of conflict reduction communications; and,
send an edited version of the electronic communication to the system specific address of a non-sending user of the paired users, the edited version not including the original address of the sender.

8. The system of claim 7, the computer server is further programmed to send the edited version of the electronic communication to the sender's address.

9. The system of claim 8, wherein the edited version comprises an auditor's comment.

10. The system of claim 7, wherein the computer server is further programmed to edit the electronic communication.

11. The system of claim 7, wherein the computer server is programmed to provide a web application for auditing purposes.

12. The system of claim 7, wherein the computer server is programmed to notify the third party of the electronic communication to be audited.

13. A non-transitory computer readable medium for reducing conflict between parties that must communicate with each other, comprising instructions stored thereon, that when executed on a processor, perform the steps of:

a. receiving an electronic message from a first user addressed to a second user, b. storing the electronic message to a database, c. checking if the first user and the second user are stored as a conflict reduction pair on the database, the conflict reduction database comprising an original address and a system specific address for each user in the database, and wherein each conflict reduction pair are parties to a divorce proceeding or a domestic violence proceeding, d. if the first user and second user are not a conflict reduction pair in the database, allowing the electronic message to continue to its destination;

e. if the first user and second user are a conflict reduction pair in the database, providing an audit interface configured to display the electronic message on an electronic display and permitting an auditor to access and edit the electronic message, and f. sending the electronic message to the second user's system-specific address after the electronic message is edited by the auditor.

14. The method of claim 13 further comprises a step of sending the electronic message to the first user's address.

15. The method of claim 14, wherein the electronic message sent to the first user's address further comprises an auditor's comment.

16. The method of claim 13, wherein the auditor comprises an automated auditing module.

17. The method of claim 13, wherein the auditor interface is a web application.

18. The method of claim 13 further comprises notifying the auditor of the electronic message to be audited.

* * * * *